(12) United States Patent
Van Vaerenbergh et al.

(10) Patent No.: US 11,135,679 B2
(45) Date of Patent: Oct. 5, 2021

(54) APPARATUS FOR ADDITIVE MANUFACTURING OF A PRODUCT WITH A CALIBRATION DEVICE AND METHOD FOR CALIBRATION OF AN APPARATUS OF THIS KIND

(71) Applicant: 3D Systems, Inc., Rock Hill, SC (US)

(72) Inventors: Jonas Van Vaerenbergh, Nieuwkerken-Waas (BE); Sam Coeck, Vertrijk (BE); Brawley Valkenborgs, Kessel-lo (BE); Rudy Raeymaekers, Arendonk (BE)

(73) Assignee: 3D Systems, Inc., Rock Hill, SC (US)

( * ) Notice: Subject to any disclaimer, the term of this patent is extended or adjusted under 35 U.S.C. 154(b) by 347 days.

(21) Appl. No.: 16/001,693

(22) Filed: Jun. 6, 2018

(65) Prior Publication Data

US 2018/0345412 A1    Dec. 6, 2018

(30) Foreign Application Priority Data

Jun. 6, 2017   (BE) .................................. 2017/5404

(51) Int. Cl.
   *B23K 26/342*     (2014.01)
   *G01B 11/00*      (2006.01)
   (Continued)

(52) U.S. Cl.
   CPC ............ *B23K 26/342* (2015.10); *B22F 12/00* (2021.01); *B23K 26/042* (2015.10);
   (Continued)

(58) Field of Classification Search
   CPC ........... B22F 2003/1056; B22F 3/1055; B23K 26/042; B23K 26/082; B23K 26/1224;
   (Continued)

(56) References Cited

U.S. PATENT DOCUMENTS

| 4,541,055 A | 9/1985 | Wolfe et al. |
| 4,833,701 A | 5/1989 | Comroe et al. |

(Continued)

FOREIGN PATENT DOCUMENTS

| CN | 106584855 | 4/2017 |
| EP | 1705616 | 9/2006 |

(Continued)

OTHER PUBLICATIONS

English Translation of Chinese First Office Action for Chinese Application No. 201810573307.9 dated Jan. 3, 2020 (16 pages).

(Continued)

*Primary Examiner* — Ibrahime A Abraham
*Assistant Examiner* — Ket D Dang

(57) ABSTRACT

An apparatus for layered manufacture of a three-dimensional product includes a build chamber having a window, a build platform within the build chamber, a calibration device that is physically separated from the build chamber, an optical system including a beam source and a scanning apparatus, and a mobile base. The mobile base is configured to position the scanning apparatus at two spaced part positions including a (1) production position and a (2) calibration position. At the production position the scanning apparatus is configured to receive an energy beam from the beam source and to reflect and scan the energy beam through the window and to a build surface over the build platform to create a layer of the three-dimensional product. At the calibration position the scanning apparatus is configured to reflect the energy beam to the calibration device but not through the window.

16 Claims, 1 Drawing Sheet

(51) Int. Cl.
| | |
|---|---|
| *B33Y 10/00* | (2015.01) |
| *B33Y 30/00* | (2015.01) |
| *B23K 26/70* | (2014.01) |
| *B23K 26/082* | (2014.01) |
| *B23K 26/12* | (2014.01) |
| *B33Y 50/02* | (2015.01) |
| *B23K 26/042* | (2014.01) |
| *B29C 64/268* | (2017.01) |
| *G05B 19/401* | (2006.01) |
| *B22F 12/00* | (2021.01) |
| *B22F 10/10* | (2021.01) |

(52) U.S. Cl.
CPC .......... *B23K 26/082* (2015.10); *B23K 26/123* (2013.01); *B23K 26/127* (2013.01); *B23K 26/1224* (2015.10); *B23K 26/705* (2015.10); *B23K 26/707* (2015.10); *B29C 64/268* (2017.08); *B33Y 10/00* (2014.12); *B33Y 30/00* (2014.12); *B33Y 50/02* (2014.12); *G01B 11/002* (2013.01); *G05B 19/4015* (2013.01); *B22F 10/10* (2021.01)

(58) Field of Classification Search
CPC .. B23K 26/123; B23K 26/127; B23K 26/342; B23K 26/705; B23K 26/707; B29C 64/268; B33Y 10/00; B33Y 30/00; B33Y 50/02; G05B 19/4015; G01B 11/002
USPC ..... 219/76.1, 121.83, 121.73; 264/40.6, 406, 264/497; 156/379.6, 378; 700/95, 97, 700/98, 105, 108, 109, 110, 117, 118, 700/119, 123, 159, 160, 166, 169, 174, 700/179, 182, 245
See application file for complete search history.

(56) References Cited

U.S. PATENT DOCUMENTS

| | | | | |
|---|---|---|---|---|
| 4,927,485 | A | * | 5/1990 | Cheng .................. G01B 11/22 156/345.25 |
| 5,135,695 | A | * | 8/1992 | Marcus .................. B29C 64/40 264/141 |
| 5,622,567 | A | * | 4/1997 | Kojima ................. C23C 14/087 118/726 |
| 6,129,884 | A | * | 10/2000 | Beers .................... B33Y 30/00 264/401 |
| 2015/0100149 | A1 | | 4/2015 | Coeck et al. |
| 2016/0236279 | A1 | * | 8/2016 | Ashton ................ B29C 64/153 |
| 2017/0100895 | A1 | | 4/2017 | Chou et al. |
| 2017/0173689 | A1 | | 6/2017 | Okazaki et al. |
| 2018/0093416 | A1 | * | 4/2018 | Prexler ................ B29C 64/268 |

FOREIGN PATENT DOCUMENTS

| | | |
|---|---|---|
| EP | 2186625 | 1/2009 |
| EP | 3162542 | 4/2016 |
| JP | 2001-351876 | 12/2001 |
| JP | 2003-001713 | 1/2003 |
| JP | 2006-323361 | 6/2008 |
| JP | 6129945 | 5/2017 |
| KR | 10-1682087 | 12/2016 |

OTHER PUBLICATIONS

European Search Report and Written Opinion for EP 18176381.4 dated Oct. 12, 2018 (8 pages).
English Translation of Korea's Non-Flnal Office Action for Korean Application No. 10-2018-0065671, dated Jun. 7, 2018 (7 pages).
English Translation of Japanese First Office Action for Japanese Application No. 2018-108643, dated Aug. 22, 2019 (4 pages).

* cited by examiner

APPARATUS FOR ADDITIVE MANUFACTURING OF A PRODUCT WITH A CALIBRATION DEVICE AND METHOD FOR CALIBRATION OF AN APPARATUS OF THIS KIND

CROSS REFERENCE TO RELATED APPLICATIONS

This patent application claims priority to Belgium patent application serial number BE2017/5404, filed on Jun. 6, 2017, and incorporated herein by reference.

SUMMARY

In general, calibration is required in production processes using an energy beam, more specifically a laser beam, in combination with a scanner to move the beam when manufacturing a product. This normally requires both calibration of the power of the laser beam and calibration of the XY accuracy of the scanner in the plane where the product is being built. According to the state of the art, these calibrations are mostly carried out in the build chamber itself in the apparatus. The laser power is measured in the build chamber by installing and reading one or more sensors in the build chamber.

Calibration of a scanner can be handled in various ways. One example here would be to build a product and then measure the actual dimensions of the product, such as by using a coordinate measurement machine, and comparing these dimensions with the predetermined product dimensions. The discrepancies detected can then be used to determine scale factors, offsets or correction tables in order to compensate for these discrepancies when manufacturing a subsequent product in the apparatus.

In some cases, a flat plate with known dimensions or with reference points is placed at a known position in the build chamber to compare the discrepancies between the actual position of a point of incidence of the laser beam at this place and a selected position of the laser beam.

According to a different method of calibration of the scanner, relatively expensive sensors are placed in the build chamber to measure the position of certain coordinates of the point of incidence of the laser beam.

These calibration methods, according to the state of the art, have the drawback that they can only be carried out sporadically because they take a great deal of time and because the measurements must be taken offline. More specifically, application of the existing calibration methods always requires opening of the build chamber and removal of the manufactured product from the build chamber. In other words, this entails that it is not possible to conduct interim calibration of the laser power or the scanner during manufacture of a product, without opening the process chamber.

The invention seeks to eliminate these drawbacks by offering an apparatus and a method that enable simple and fast measurement and calibration of the power of the laser beam, as well as calibration of the scanning means, without having to open the build chamber. More specifically, the invention seeks to enable interim calibration when a product is being manufactured, without having to open the build chamber. Therefore, it is possible to continue a production process after completion of a calibration, without having to open the build chamber. This is primarily of interest in the manufacture of relatively large products. The invention will therefore enable maintenance of low or high pressure or a protective atmosphere in the build chamber during calibration of the scanning means or the beam.

To this end, the apparatus, according to the invention, contains a calibration device for said beam source and/or said scanning means, where at least the scanning means can be moved with respect to the build chamber between a production position, in which the beam can pass through said window and enter the build chamber, and a calibration position, in which the beam can strike the calibration device.

For this purpose, the apparatus is fitted with guiding means for the scanning means that enable the scanning means to move between the production position and the calibration position.

Advantageously, the beam source and the scanning means are mounted to the same mobile base.

The invention also relates to a method for manufacture of a three-dimensional product in a build chamber by means of an additive manufacturing technique with an optical system and a method for calibration of this optical system. Here, the optical system works in combination with a controller. The optical system has at least a beam source to generate an energy beam with corresponding scanning means to move a point of incidence of this beam in the build chamber. According to the method, the optical system is placed in a production position so that said beam, by means of the scanning means, enters the build chamber through a window in its wall. Said product is manufactured by transforming a powder in the build chamber into successively adhered layers of the product, when moving the beam.

One characteristic of this method is that to calibrate the optical system, at least the scanning means are moved with respect to the build chamber from the production position to the calibration position and an actual value is measured for at least a parameter of the optical system and the actual value measured is compared to a selected value for said parameter. Next, the scanning means are returned to the production position and the optical system is adjusted such that the actual value of at least a parameter corresponds to the selected value of the corresponding parameter, where the product is subsequently manufactured.

According to an interesting method, according to the invention, the manufacture of the product is temporarily stopped, while maintaining production pressure in the build chamber, when the optical system is moved to the calibration position. Manufacture of the product then continues once the optical system returns to the production position after calibration.

BRIEF DESCRIPTION OF FIGURES

Further details and advantages of the invention shall be indicated in the below description of some specific embodiments of the apparatus and method, according to the invention. This description is only given as an example and does not restrict the scope of the protection claimed; the reference numerals used below pertain to the appended figures.

In the various figures, the same reference numerals pertain to the same or analogous members.

DETAILED DESCRIPTION OF THE PREFERRED EMBODIMENTS

In general, the apparatus according to the invention relates to a machine for production of three-dimensional products by application of an additive manufacturing technique. In a technique of this kind, a product is built by manufacturing its successively adhered layers. Here, for instance, metal powder is used, which is melted with a laser beam that moves according to the pattern for a cross-section of the product. One example of an interesting additive manufacturing technique is selective laser melting, where a laser beam is moved over successive powder layers in order to melt and solidify this powder according to a pattern that corresponds to successive cross-sections of the product.

In additive production processes, where an energy beam, such as a laser, is moved according to a pattern in order to transform a raw material, such as metal powder, in order to build the product, it is important for the movement of the beam to be highly accurate in order to manufacture a product with minimal dimensional tolerances. For this, it is important to check the apparatus regularly for discrepancies and if desired, to conduct calibrations on the apparatus.

Figure 1:
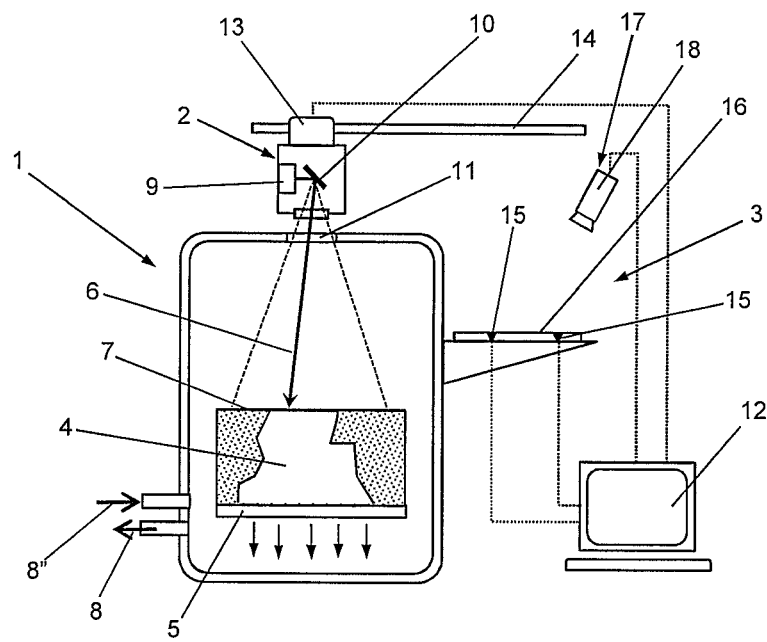
FIG. 1 is a schematic front view of a build chamber, an optical system and a calibration device of the apparatus, according to the invention, where the optical system is located in a production position.

FIG. 1 is a schematic of a build chamber 1 with an optical system 2 and a calibration device 3. In build chamber 1, as product 4 is manufactured by applying successive powder layers on top of a build platform 5 on a build surface 7 and, after application of each powder layer, striking the last layer applied with an energy beam 6 and moving this beam over this layer in order to create a layer of the product 4. The beam 6 may comprise a laser beam, for instance. After creation of a layer of the product 4, the build platform 5 is moved downwards over a distance corresponding to the thickness of this layer so that the top of the product again extends into said build surface 7 so that a subsequent powder layer can be applied.

Before commencing construction of a product 4, the air is evacuated from the build chamber 1, as indicated by arrow 8, to bring the build chamber under low pressure or to enable manufacture of the product 4 in an inert atmosphere. An inert atmosphere or a gas can be pumped into the build chamber, as indicated by arrow 8".

The optical system is located outside of the build chamber 1 and contains a beam source 9, in particular a laser beam, and scanning means 10 to enable the beam 6 generated by the beam source 9 to pass through a window 11 and enter the build chamber 1. The window 11 hermetically seals an opening in the wall of the build chamber 1 and is transparent for the beam 6.

The scanning means 10 are controlled by a control unit 12 that contains a computer. Thus, the control unit 12 controls the scanning means 10 in order to move the beam 6 in the build chamber 1 over said powder layer. These scanning means 10 comprise, for instance, one or more galvanometers with one or more movable motorized mirrors in order to move the point of incidence of the beam over the powder layer according to a pattern that corresponds to a two-dimensional cross-section of the product being built.

As shown in FIG. 1, the optical system 2 is located opposite said window 11 in a production position, where the beam 6 can pass through the window 11 and enter the build chamber 1.

Figure 2:
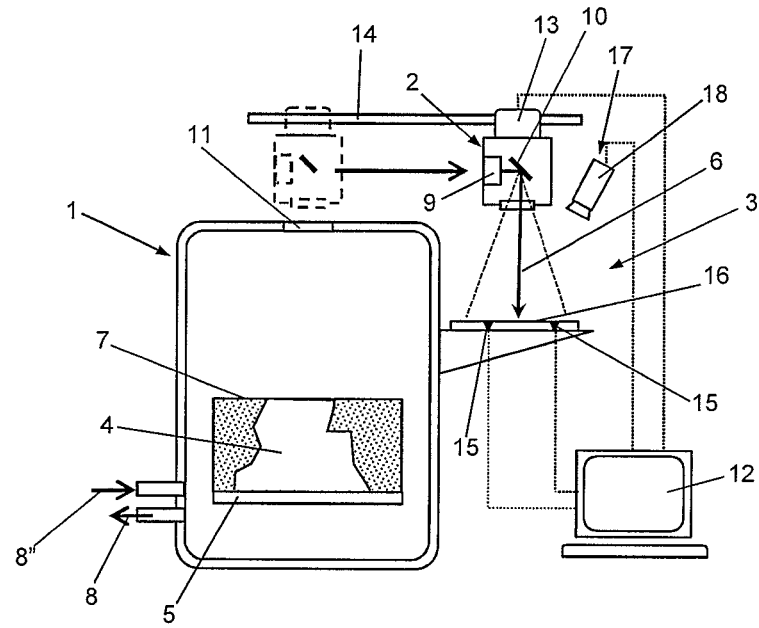
FIG. 2 is a schematic front view of the apparatus from FIG. 1, when the optical system is in a calibration position.

The scanning means 10 and the beam source 9 of the optical system 2 can be moved together with respect to the build chamber 1 between said production position and a calibration position. FIG. 2 shows the optical system with the scanning means 10 and the beam source 9 in this calibration position, where the beam 6, by means of the scanning means 10, can strike the calibration device 3.

Preferably, the beam source 9 and the scanning means 10 are mounted to the same mobile base 13 so that they have a fixed position with respect to one another. The mobile base 13 works in combination with guiding means over which this base 13 can be moved between the production position and the calibration position. In the embodiment of the apparatus shown in the figures, according to the invention, these guiding means contain a guide rail 14 that is mounted fixed with respect to the build chamber 1. Thus, it is possible to move said base 13 along a unique and known path between the two positions.

In an alternative embodiment of the apparatus, according to the invention, only said scanning means 10 can be moved with respect to the build chamber 1 between a production position and a calibration position, while the beam source 9 has a fixed, possibly adjustable, position with respect to the build chamber. It is also possible for the beam source 9 and the scanning means 10 to be movable independently of one another.

In an initial embodiment of the calibration device 3, this is fitted with a number of fixed sensors. These sensors comprise position sensors 15 to measure the position of the point of incidence of the beam 6 on a surface.

These sensors 15 enable, for instance, detection of when the point of incidence of the beam 6 is located on the sensor. This may be achieved by measuring the intensity of the energy striking the sensor 15. Here, a limit value is set such that when this limit value is exceeded, it is decided that the point of incidence of the beam is located on the sensor 15 with a known position.

Preferably, the calibration device 3 contains at least two, and preferably at least three, position sensors 15 to measure the position of the point of incidence of the beam 6 at different positions in a two-dimensional calibration plane 16.

Said sensors 15 may also include photodiodes or other types of beam detectors, for instance. Thus, for instance, these sensors 15 may be made up of one or more camera systems 17 that detect when the point of incidence of the beam strikes a predetermined position on the calibration plane 16 or that measure a position of the point of incidence of the beam 6 on this plane 16. The embodiment shown in the figures indicates both position sensors 15 that are provided in the calibration plane 16 and sensors that include a camera 18.

Moreover, the apparatus contains means, in particular a computer, to determine the discrepancy between an actual measured position of a point of incidence on the calibration plane 16 and a position of this point of incidence selected or set by the control unit. In order to increase the accuracy of the build process, the parameters in the control unit are adjusted such that the selected or set position corresponds to the actual position of the point of incidence.

The calibration device preferably also contains a power sensor to measure the power actually delivered by the beam. This actual measured power is compared to the set and desired power for this beam. When the value of the actual power deviates from the set desired power, adjustment means are used to change the actual power delivered such that it corresponds to the desired power.

In general, the calibration device 3 that is fitted on the apparatus, according to the invention, may contain any traditional calibration system that is used, according to the state of the art, in the build chamber 1 to calibrate the beam source 9 or the scanning means 10.

Notwithstanding the calibration, preferably, by means of adjustment of a number of parameters in the control unit 12, this can of course also be carried out by manual adjustment of the physical position of the scanning means 10 or other components of the optical system 2.

The main advantage of the invention is that it is no longer necessary to open the build chamber in order to perform a calibration of the optical system 2 or its components. Thus, during the build process for relatively large products, a new calibration can be performed at regular intervals without having to open the build chamber 1.

Thus, the manufacture of a product 4 is temporarily stopped and, while maintaining production pressure in the build chamber 1, the optical system 2 is moved to calibration position. Next, the optical system 2 is calibrated and moved back to the production position to continue manufacture of the product 4.

According to the invention, in the calibration position of the scanning means 10 and/or the beam source 9, an actual value of at least a parameter of the optical system 2 is measured and compared to a selected or set value for said parameter. Next, the scanning means 10 are returned to the production position, where the optical system is adjusted such that the actual value of the parameter in question corresponds to the selected or set value of the this parameter.

Thus, said parameter corresponds, for instance, with a position of a point of incidence of the beam 6 on the calibration plane 16, in said calibration position, where this position is set using said control unit 12. In this case, the value for this position measured using the calibration device 3 is the actual value of the parameter that corresponds to said position, where the discrepancy between this actual position of the beam 6 and its set position is then determined.

In the same way, said parameter is the power of the beam 6, for instance, so that the actual measured value of this parameter determines the discrepancy between an actual power of the beam 6 and its set or selected power.

Moreover, it is also possible for said parameter to pertain to the focus diameter, the intensity or the focus distance of the beam 6, where corresponding sensors are provided to measure these parameters. In general, the calibration device 3 preferably enables measurement of multiple characteristic parameters related to the quality of the beam within the framework of the additive manufacturing technique applied.

In the figures, the level of said calibration plane 16 is higher than that of the build surface 7. This offers the advantage that the calibration plane 16 can have a smaller surface area than the build surface 7, but this typically requires a scale factor to be applied when conducting the calibration. The level of said calibration plane 16 may correspond to that of the build surface 7.

According to a simple embodiment of the device and the method, according to the invention, the calibration plane 16 is made up of a film, such as an optically sensitive film, that is placed in the calibration device 3. Here, when the scanning means 10 are moved to the calibration position, the beam 6 is moved over this film with the scanning means according to positions selected or set by an operator. The film is then measured manually offline. Thus, the control unit does not receive automatic feedback: instead the operator must enter the results of the measurements manually into the control unit.

The invention is of course not restricted to the embodiments of the apparatus or method described above and proposed in the accompanying figures. Thus, within the framework of the inventions, different variants may be considered.

Although the above description specifies an optical system 2 that only contains scanning means 10 for a beam source 9, it is of course possible for this optical system 2 to be fitted with multiple scanning means 10 for different beams. Thus, the optical system 2 may also contain multiple beam sources 9.

What is claimed:

1. An apparatus for layered manufacture of a three-dimensional product with a build chamber in which said product is built and an optical system, external with respect to the build chamber, that contains at least one beam source to generate an energy beam and corresponding scanning means to move the energy beam, where a control unit is provided that controls the scanning means in order to move the energy beam so that it strikes a selected position, where a wall of the build chamber includes a window that is transparent for the energy beam so it passes through the window and enters the build chamber,
wherein the apparatus contains a calibration device for the scanning means, at least the scanning means is configured to be moved with respect to the build chamber between a production position, in which the energy beam can pass through said window and enter said build chamber, and a calibration position, in which the energy beam can strike the calibration device but cannot pass through the window.

2. The apparatus according to claim 1 further comprising a mobile base coupled to a guide rail and supporting the scanning means, the mobile base configured to be translated along the guide rail between the production position and the calibration position.

3. The apparatus according claim 1, wherein said beam source and said scanning means are both supported by the mobile base and move together along the guide rail.

4. The apparatus according to claim 1, wherein said calibration device contains at least a power sensor to measure a power delivered by the energy beam.

5. The apparatus according to claim 4, wherein adjusting means are provided to compare the power delivered by the energy beam with a desired power of the energy beam, wherein the adjusting means enable changing the power delivered by the energy beam to said desired power.

6. The apparatus according to claim 1, wherein said calibration device contains a position sensor to measure a position of the energy beam.

7. The apparatus according to claim 6, wherein the calibration device contains at least two position sensors to measure the position of the energy beam at different positions.

8. The apparatus according to claim 6, wherein said position sensor enables measurement of a position of a point of incidence of the energy beam on a two-dimensional plane of the calibration device.

9. The apparatus according to claim 8, wherein the control unit is configured to determine a discrepancy between the measured position of said point of incidence and an expected position of the point of incidence.

10. The apparatus according to claim 9 claim wherein the scanning means includes one or more movable motorized mirrors.

11. The apparatus according to claim 1, wherein said build chamber is filled with an inert atmosphere.

12. The apparatus according to claim 1, wherein said beam source is made up of a laser source, while said energy beam comprises a laser beam.

13. An apparatus for layered manufacture of a three-dimensional product comprising:
a build chamber including a window;
a build platform within the build chamber;

a calibration device that is physically separated from the build chamber;

an optical system including a beam source and a scanning apparatus, the scanning apparatus including one or more moveable motorized mirrors;

a control unit configured to operate portions of the apparatus for layered manufacture including the calibration device and the optical system; and a mobile base configured to position the scanning apparatus at two spaced part positions including a (1) production position and a (2) calibration position;

(1) at the production position the scanning apparatus is configured to receive an energy beam from the beam source and to reflect the energy beam through the window and to a build surface over the build platform and to scan the energy beam over the build surface to create a layer of the three-dimensional product;

(2) at the calibration position the scanning apparatus is configured to reflect the energy beam to the calibration device, at the calibration position the scanning apparatus cannot reflect the energy beam through the window.

14. The apparatus for layered manufacture of claim 13 wherein the mobile base is configured to support the optical system including the beam source and the scanning apparatus.

15. The apparatus for layered manufacture of claim 13 wherein the mobile base is mounted on a guide rail that extends between the production position and the calibration position.

16. The apparatus for layered manufacture of claim 13 wherein the calibration device is configured to provide information to the control unit that is indicative of one or more of power delivered and alignment of the energy beam.

* * * * *